United States Patent [19]
Milne

[11] 3,972,492
[45] Aug. 3, 1976

[54] AIRSHIP FOR TRANSPORTING GAS

[76] Inventor: William G. Milne, 500 Bradie Bldg., 630 6th Ave. SW., Calgary, Alberta, Canada

[22] Filed: Jan. 29, 1975

[21] Appl. No.: 545,319

[52] U.S. Cl.................................. 244/30; 244/128
[51] Int. Cl.².......................................... B64B 1/06
[58] Field of Search .............. 244/30, 24, 128, 115; 114/74 R, 74 A; 150/.5; 220/85 B; 206/522

[56]         References Cited
         UNITED STATES PATENTS

| | | | |
|---|---|---|---|
| 1,241,623 | 10/1917 | Gusey | 244/30 |
| 1,390,745 | 9/1921 | Armstrong | 244/30 |
| 1,748,500 | 2/1930 | Thaden | 244/115 |
| 1,806,939 | 5/1931 | Gramp | 244/116 |
| 1,861,780 | 6/1932 | Bowers | 244/115 |
| 1,865,790 | 7/1932 | Rosendahl | 244/115 |
| 1,900,744 | 3/1933 | Strobl | 244/128 |
| 2,094,619 | 10/1937 | Reichert et al. | 244/97 |
| 2,150,428 | 3/1939 | Crum et al. | 244/115 |
| 2,856,867 | 10/1958 | Dasey | 206/522 X |
| 3,180,590 | 4/1965 | Fitzpatrick | 244/30 |
| 3,456,903 | 7/1969 | Papst | 244/30 |
| 3,488,019 | 1/1970 | Sonstegaard | 244/30 |
| 3,531,064 | 9/1970 | McCutchan | 244/31 |
| 3,567,160 | 3/1971 | Adams et al. | 244/115 |
| 3,583,352 | 6/1971 | Alleaume | 114/74 A |
| 3,620,485 | 11/1971 | Gelhard | 244/128 X |
| 3,706,433 | 12/1972 | Sonstegaard | 244/128 |
| 3,844,507 | 10/1974 | Papst | 244/30 |

FOREIGN PATENTS OR APPLICATIONS

809;695    3/1959    United Kingdom

OTHER PUBLICATIONS

"News and Comment", p. 580.

*Primary Examiner*—Trygve M. Blix
*Assistant Examiner*—Barry L. Kelmachter
*Attorney, Agent, or Firm*—Larson, Taylor and Hinds

[57]          ABSTRACT

The invention is new construction of a dirigible for use in transporting natural gas. The aircraft has a rigid outer shell forming an elongated body. The aircraft has a plurality of collapsible chambers for holding cargo gas serially disposed along the longitudinal axis of the rigid outer shell. The collapsible chambers are inter-connected by a common manifold disposed within the rigid outer shell that penetrates the outer shell for the purpose of loading and unloading the cargo gas.

9 Claims, 4 Drawing Figures

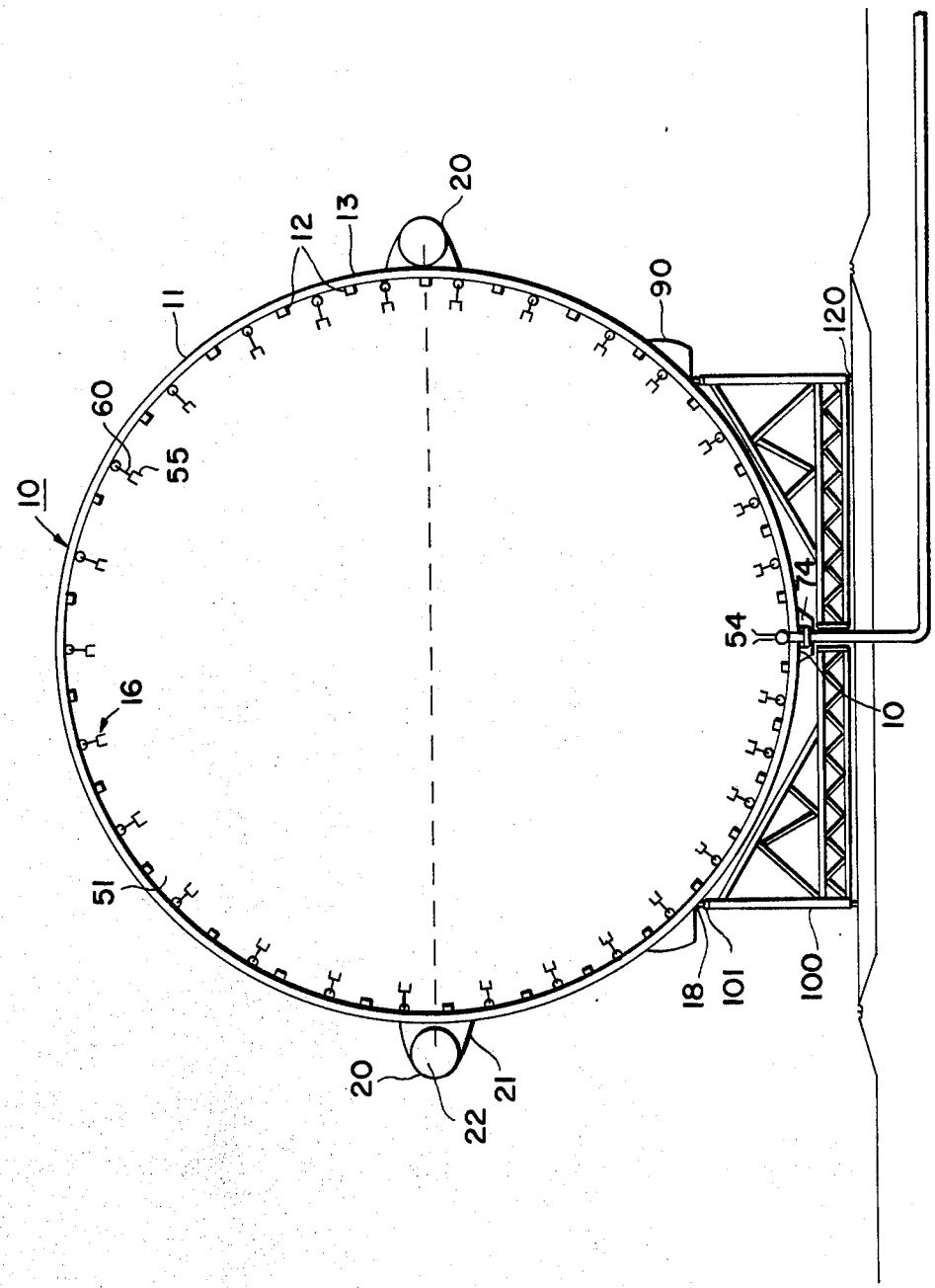
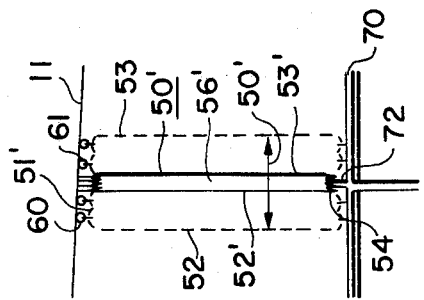

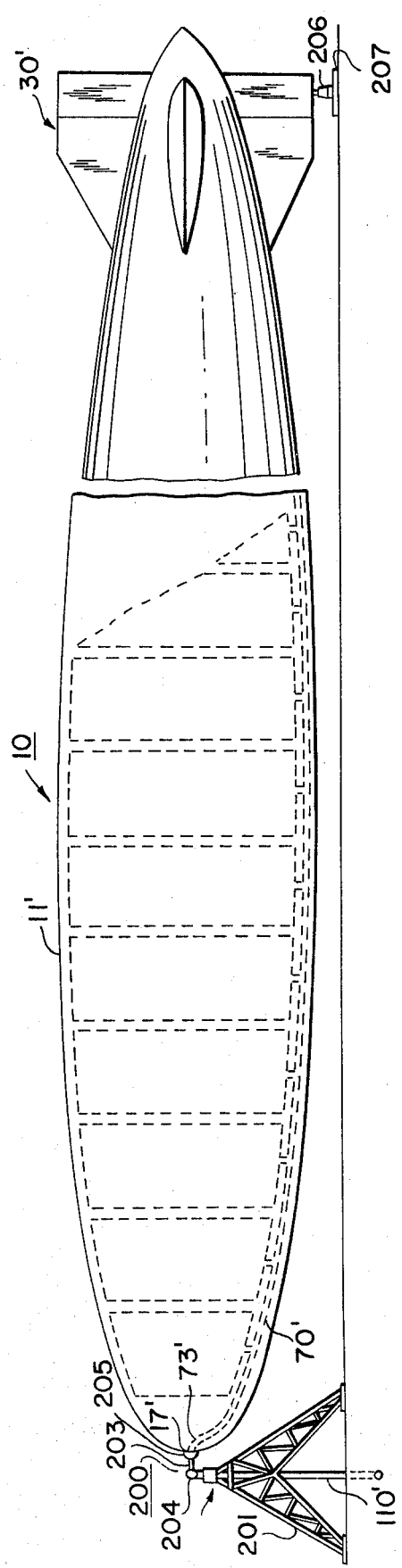

AIRSHIP FOR TRANSPORTING GAS

FIELD OF THE INVENTION

Natural gas is becoming an increasingly more valuable natural resource. However, there are considerable problems in transporting the gas from the gas field to the consumer. In the past, pipelines have been used; but pipelines have considerable disadvantages in that they are very expensive and their overland construction relies on political cooperation. The high cost prevents the tapping of smaller gas fields. A second method of shipment used is to ship liquified natural gas. However, cost problems arise in that expensive plants must be built to convert the gas to liquid and back to gas. The transport ships themselves have to be built to maintain the liquified natural gas at −161°C, and such a ship is very expensive.

The natural buoyancy of natural gas makes it unusually well adapted for transport by a lighter than air aircraft. It can provide both lifting force and fuel for propulsion.

SUMMARY OF THE INVENTION

The invention is a new contruction of a dirigible. The dirigible has an elongated body having a rigid outer shell and a means for propulsion. Inside the elongated body there are a plurality of collapsible chambers for holding gas connected by a common manifold. The common manifold has an outlet through the rigid outer shell for the purpose of loading and unloading the cargo gas.

As previously discussed in the field of the invention, a lighter than air aircraft for transporting gaseous natural gas has many advantages over the other existing methods of transport. The initial investment is considerably smaller than a pipeline, and the dirigible is not tied to the land. This allows tapping smaller gas fields then would normally be economically feasible with a pipeline. The use of the airship eliminated the risk of loss of a pipeline to a host country in the event of a change in the political climate.

The transport of natural gas in its natural state offers advantages over liquid state transport in that expensive conversion plants need not be built.

The aircraft has incorporated the use of several separate chambers for holding the cargo gas. This compartmentalization of the flammable gas will help prevent the fiery catastrophies of the past. The collapsible nature of the cargo gas chambers in conjunction with a common gas manifold will facilitate unloading and loading the cargo.

Other features and advantages of the present invention will be set forth in or apparent from the detailed description of preferred embodiments of the invention found hereinbelow.

DESCRIPTION OF THE DRAWINGS

FIG. 2 is a diagrammatic front elevation sectional view taken along secion line AA of FIG. 1.

FIG. 3 is a diagrammatic side elevation view of a collapsible gas bag used in the dirigible of FIG. 1.

FIG. 4 is a diagrammatic side elevation partly sectioned view of an alternate embodiment of the invention.

DESCRIPTION OF THE INVENTION

Figure 1:
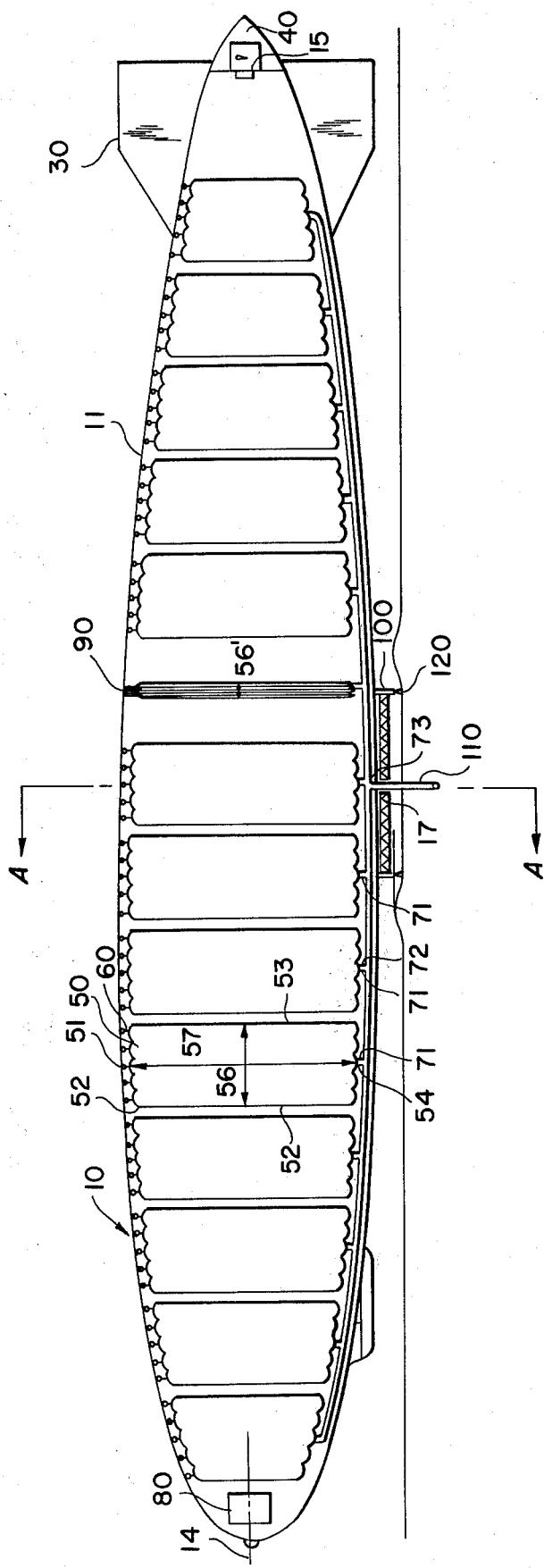
FIG. 1 is a diagrammatic side elevation sectional view of a dirigible according to the invention.

Referring to FIGS. 1–3, the dirigible is denoted as 10. The dirigible has an outer shell 11. The outer shell 11 is an elongated, rigid envelope closed in the frontal area and having an opening 15 in the extreme rearward section.

The outer shell 11 has a circular transverse cross section, as seen in FIG. 2. However, the invention is intended to include any suitable aerodynamic transverse cross section.

The outer shell 11 comprises a rigid frame structure 12 and an airtight outer skin 13 entirely covering the frame structure 12. This outer shell 11 protects the inner collapsible chambers 50 from the elements and provides an efficient aerodynamic shape.

The dirigible 10 has several conventional airship engines 20 to provide propulsion and directional guidance. While two engines 20 are shown in the drawings, it is contemplated that several more engines of conventional size would be employed on an airship of large size which is preferred in the present invention. The rotary engines 20 are used for main aircraft propulsion and can be rotated to assist in the landing or taking off of the dirigible.

The dirigible 10 has conventional airfoils 30 which are used to direct the dirigible 10 while in flight. The airfoils 30 are attached to and extend outwardly from the rear portion of the outer shell 11. In a transverse cross section of the rear portion of outer shell 11, the airfoils 30 are equally spaced circumferentially around the rear section.

At the extreme rearward portion of the outer shell 11 is an aperture 15. The aperture allows air passage into and out of the interior of the outer shell 11. Mounted in aperture 15 is a fan 40 which will move air in and out of the interior of the shell to assist in expanding and collapsing collapsible gas chambers 50 located within the dirigible. In order to reduce the possibility of fire, a gas other than air, such as an inert gas or a mixture of air and inert gas, may be moved in and out of the interior of the shell.

Collapsible chambers 50 are serially arranged along the longitudinal axis 14 of the outer shell 11. Each collapsible chamber 50 is generally cylindrical in shape and fits within the inside diameter of outer shell 11.

The collapsible chambers 50 have a circumferential surface 51, a forward axially planar end 52 and a rearward axially planar end 53. The circumferential surface 51 is pliable and can be closed down upon itself or opened out along the longitudinal axis thus allowing the gas chambers 50 to be collapsed or expanded. Circumferential surface 51 may be pleated or corrugated to facilitate expansion or collapse of the gas chambers. Each collapsible chamber 50 has a gas outlet connection 54 protruding from the longitudinal center of the bottom of the circumferential surface 51. Around the periphery of each collapsible bag 50 are a set of hangers 60 attached to the circumferential surface 51, for supporting the bag 50. The hangers 60 are attached to rollers 61 which ride in longitudinal tracks 16. Longitudinal tracks 16 run longitudinally along the inside surface of structure 12 of the outer shell 11. The attachment of the collapsible chamber 50 to the outer shell 11 via rollers 61 and track 16 offers a minimum of resistance to expansion and contraction of the collapsible chambers.

Although these collapsible chambers 50 are cylindrical in shape, the invention encompasses any shape of chamber that will fit within the outer shell of any suitable aerodynamic shape.

The collapsible chambers 50 are principally designed to carry a lighter than air cargo gas, such as natural gas. In an empty state, the chamber 50 is in its collapsed state, as seen in FIG. 3. In a collapsed state, the gas chamber 50' has an axial thickness of 56', wherein the forward end 52' and rearward end 53' are closely drawn around the longitudinally centered outlet 54. The corrugated outer circumferential surface 51' folds on itself to allow the ends 52' and 53' to be drawn towards the center. As the chamber 50 is filled, the forward end 52' and rearward end 53' move apart until they are in fully extended positions at 52 and 53 respectively.

The manifold 70 has branch pipes 71 which connect the common manifold 70 to each collapsible chamber 50 through the mating of connection 72 to gas connection 54 in the collapsible bag. A remotely controlled valve (not shown) may be installed in the mating connection 72 to control gas flow into and out of each chamber 50. The common manifold 70 has a filling main 73 which projects through the outer shell 11 for emptying and refilling the collapsible bags 50.

FIGS. 1-3 show an embodiment of the invention where the common manifold 70 projects through the bottom longitudinal center of outer shell 11. The filling main 73 has a fully rotatable seal 74 and projects through a filling hatch 17 which receives a gas connection 110. This hatch 17 provides a weatherproof covering for the filling main 73. Use of the bottom filling main 73 allows use of a turntable docking cradle 100.

The turntable 100 consists of a structure onto which the dirigible docks and is secured during loading, unloading, and during bad weather. The turntable 100 rotates around the gas source pipe 110 on circular rails 120. The outer shell 11 of dirigible 10 has support rails 18, as seen in FIG. 2, attached to the lower secion of outer shell 11 matching the contact surfaces 101 on the turntable docking cradle 100. When docked in the rotatable mounted turntable 100, the dirigible 10 can freely weathervane in the wind to minimize wind forces. For further details on the turntable unloading cradle, see copending application Ser. number 545,321, filed Jan. 29, 1975.

The dirigible 10 is a lighter than air aircraft. As such, ballast is necessary to counterbalance the buoyancy of a cargo of natural gas. Ballast tanks 90 are provided to hold oil or water for this purpose. The tanks are located on the outside shell 11 on the lower surface. Conventional means (not shown) are provided for filling and emptying the ballast.

The dirigible 10 is filled with buoyant gas at the gas field and then utilizes that buoyancy for lift in the delivery flight. Once the gas is delivered, the lifting force of the delivered gas would be eliminated. A tank 80 of lighter than air gas, such as helium, is provided to provide sufficient lifting force for the dirigible on the return flight. Alternatively, one or more of the collapsible bags 50 may be filled with a lighter than air gas for this purpose. The lighter than air gas is preferably permanently retained in the dirigible and is sufficient to provide an adequate lifting force for the return trip. Any extra buoyancy imparted by the gas product in the delivery trip can be balanced with ballast.

In an alternate embodiment of the invention shown in FIG. 4, the dirigible has a nose portion adapted for nose docking and gas loading and unloading. The nose docking and piping tower is designated as 200. The nose tower 200 has a support tower structure 201, which is built around the centrally located vertical gas source pipe 110'. A docking head 203 is rotatably mounted on the support structure 201 so as to rotate 360°. The docking head contains a loading head pipe 204 with a 90° bend to convey gas from the gas source pipe to the loading main 73' in the dirigible 10'. The connection between the loading head pipe 204 and the gas source pipe 110' contains a rotating seal, to allow 360° rotation without gas leakage.

A rear support 206 is attached to a rear airfoil 30' and provides a rear support for the docked dirigible 10'. The support 206 has wheels to allow movement on a circular track 207 having a radius approximately the length of the dirigible 10'. The arrangement of a nose docking tower structure 200 with a rotating head and a wheeled rear support structure 206 on a circular track 207 allows the dirigible to dock, unload gas, and still weathervane to avoid wind damage.

The alternate embodiment of the invention has a loading main 73' which projects through outer shell 11 at its extreme forward portion. This filling main 73' is connected to the common manifold 70'.

Although the invention has been described in detail with respect to exemplary embodiments thereof, it will be understood by those of ordinary skill in the art that variations and modifications may be effected within the scope and spirit of the invention.

What is claimed is:

1. A dirigible for transporting a cargo gas comprising:
an elongated body comprising a rigid outer shell;
means for propelling said dirigible in flight;
a plurality of collapsible chambers disposed within said outer shell for holding the cargo gas;
means for slidably supporting said collapsible chambers along the substantially entire periphery thereof;
means for loading and unloading the gas, said means including a manifold, a transfer connection in fluid communication with said manifold, and a plurality of chamber connections in fluid communication with said manifold and with corresponding ones of said collapsible chambers; and
means for facilitating the expansion and collapse of said chambers during the gas loading and unloading of said collapsible chambers.

2. A dirigible as claimed in claim 1 where said plurality of collapsible chambers are serially disposed along the longitudinal axis of said elongated body.

3. A dirigible as claimed in claim 1 wherein said collapsible chambers collapse along said longitudinal axis of said elongated body.

4. A dirigible as claimed in claim 2 wherein each said chamber connection is rigidly connected to the center of said collapsible chamber and said collapsible chambers are constructed and arranged to collapse along said longitudinal axis of said elongated body, each end of said chamber collapsing toward the center of said collapsible chamber.

5. A dirigible as claimed in claim 4 wherein said slidable support means comprising a set of rollers rolling along supports adjacent the inside surface of said outer shell.

6. a dirigible as claimed in claim 1 and said facilitating means includes means for pumping a gas into and out of said rigid outer shell to facilitate unloading and loading, respectively, of gas out of and into said collapsible chambers.

7. A dirigible as claimed in claim 1 wherein the means for unloading and loading the cargo gas is located on the bottom of said rigid outer shell.

8. A dirigible as claimed in claim 1 having a forward nose portion having a means for docking said dirigible, said nose portion having said means for unloading and loading cargo gas.

9. A dirigible as claimed in claim 1 wherein said slidable support means comprise means for moveably securing said chambers to the inside surface of said outer shell.

* * * * *